(12) United States Patent
Komatsu et al.

(10) Patent No.: US 6,804,082 B2
(45) Date of Patent: Oct. 12, 2004

(54) DISK DRIVE HAVING A FRONT SHUTTER ATTACHING STRUCTURE CAPABLE OF PREVENTING A FRONT SHUTTER FROM COMING OFF FROM A MAIN FRAME

(75) Inventors: Hisateru Komatsu, Tendo (JP); Makoto Takahashi, Obanazawa (JP)

(73) Assignee: Mitsumi Electric Co., Ltd., Tokyo (JP)

(*) Notice: Subject to any disclaimer, the term of this patent is extended or adjusted under 35 U.S.C. 154(b) by 103 days.

(21) Appl. No.: 10/231,226

(22) Filed: Aug. 29, 2002

(65) Prior Publication Data

US 2003/0043501 A1 Mar. 6, 2003

(30) Foreign Application Priority Data

Aug. 30, 2001 (JP) ........................................ 2001-261803

(51) Int. Cl.[7] .......................... G11B 17/04; G11B 33/02
(52) U.S. Cl. .................................................. 360/99.02
(58) Field of Search .......................... 360/97.01, 97.02, 360/99.01, 99.02, 99.06, 99.07, 137

(56) References Cited

U.S. PATENT DOCUMENTS

| | | | | |
|---|---|---|---|---|
| 5,303,104 A | * | 4/1994 | Aruga et al. ............. 360/267.2 |
| 5,402,286 A | * | 3/1995 | Hamahata ................... 360/96.5 |
| 5,648,882 A | * | 7/1997 | Tangi et al. ............. 360/99.06 |
| 5,701,216 A | * | 12/1997 | Yamamoto et al. ....... 360/99.02 |
| 5,924,782 A | * | 7/1999 | Park ........................... 312/328 |
| 5,940,245 A | * | 8/1999 | Sasaki et al. ............ 360/99.06 |
| 6,351,374 B1 | * | 2/2002 | Sherry ......................... 361/685 |
| 6,442,122 B1 | * | 8/2002 | Takahashi ................... 369/77.1 |

* cited by examiner

*Primary Examiner*—Jefferson Evans
(74) *Attorney, Agent, or Firm*—Frishauf, Holtz, Goodman & Chick, P.C.

(57) ABSTRACT

A front shutter attaching structure comprises flanges formed on peripheral surfaces of coaxial pivots of a front shutter and hooks formed at a cover for covering an upper side of a main frame. The front shutter is attached to the main frame by inserting of the pivots into holes formed in side plates of the main frame. Because the flanges are impossible to be inserted into the holes of the main frame, they restrict movement of the front shutter in a direction along the pivots against the main frame. Each of the hooks is located between a door member of the front shutter and each of the flanges when the cover is fixed to the main frame. The hooks restrict movement of the flanges in the direction along the pivots at the base side of the pivots.

9 Claims, 6 Drawing Sheets

DISK DRIVE HAVING A FRONT SHUTTER ATTACHING STRUCTURE CAPABLE OF PREVENTING A FRONT SHUTTER FROM COMING OFF FROM A MAIN FRAME

BACKGROUND OF THE INVENTION

This invention relates to a flexible disk drive, in particular, to a front shutter attaching structure for rotatably attaching a front shutter to a loading slot of the flexible disk drive.

As well known, a flexible disk drive (hereinafter simply called FDD) is an apparatus for carrying out data recording and reproducing operations to and from a disk-shaped magnetic recording medium of a flexible disk (hereinafter simply called FD) loaded thereinto. The FDD is widely used for an external memory apparatus of an electronic information apparatus such as a personal computer.

Generally, the FDD of this type provides a front shutter for a loading slot into which the FD is inserted. The front shutter is located at the inside of the loading slot and always pressed by a torsion spring against the loading slot. The front shutter is opened inside by insertion of the FD against pressing force of the torsion spring.

In a related front shutter attaching structure for attaching the front shutter to the loading slot of the FDD, the front shutter has a pair of coaxial pivots formed at both ends thereof. The FDD comprises a frame with side plates in which holes for receiving the coaxial pivots are formed. The tip parts of the coaxial pivots are merely inserted into the holes of the side plates so that the front shutter can rotate against the frame.

The related front shutter attaching structure has a problem that a door member of the front shutter is easily bent by improper insertion of the FD and thereby the front shutter is detached from the frame.

SUMMARY OF THE INVENTION

It is therefore an object of this invention to provide a front shutter attaching structure capable of preventing a front shutter from coming off from a frame of an FDD without relatively large-scale structure modification and an increase of parts.

Other object of this invention will become clear as the description proceeds.

According to an aspect of this invention, a front shutter attaching structure is for attaching a front shutter to a main frame of an FDD. The front shutter has a door member and a pair of pivots projecting from both sides of the door member. The main frame has holes for receiving said pivots. The front shutter attaching structure comprises flanges formed on peripheral surfaces of the pivots. Restrictive members are fixed against the main frame to restrict movement of the flanges in directions along the pivots.

According to another aspect of this invention, a front shutter attaching structure is for attaching a front shutter to a main frame of an FDD. The front shutter has a door member for closing an FD loading slot of the FDD and a pair of pivots projecting from both sides of an edge of the door member. The main frame has side plates opposed to each other and having holes for receiving the pivots. The front shutter attaching structure comprises flanges formed on the pivots at a distance from tips of the pivots. Restrictive members restrict movement of the flanges in directions along the pivots at base sides of the pivots in a case where the tips of the pivots are inserted in the holes of the side plates of the main frame.

DESCRIPTION OF THE PREFERRED EMBODIMENT

Figure 1:
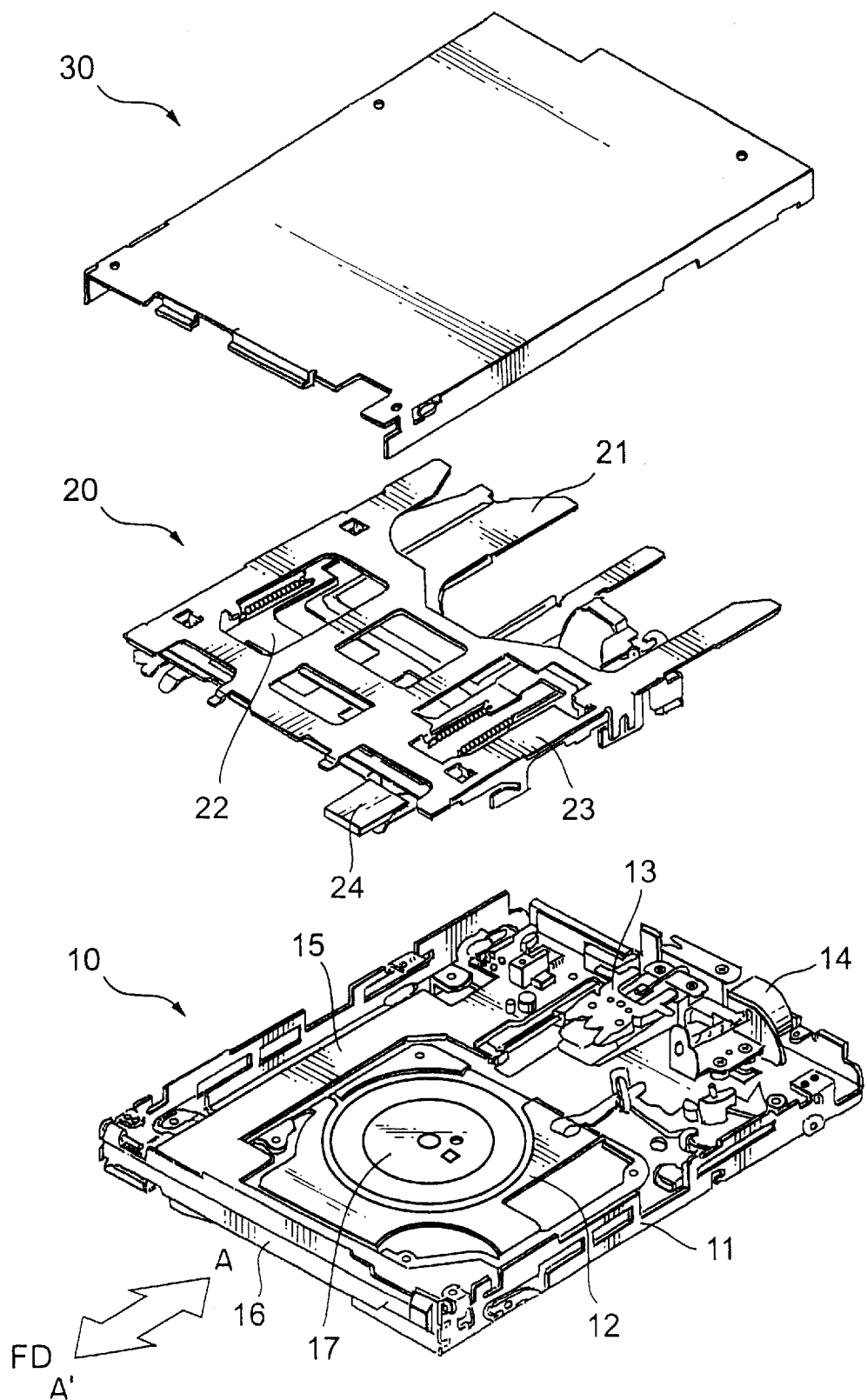
FIG. 1 is an exploded perspective view of an FDD adopting a related front shutter attaching structure.

Referring to FIG. 1, description will be at first directed to a thin-model FDD adopting a related front shutter attaching structure for a better understanding of this invention.

As shown in FIG. 1, the FDD comprises a main assembly 10, an FD loading/ejecting mechanism portion 20 and a cover 30. The FDD further comprises a front panel (not shown) with an FD loading slot for loading/ejecting an FD. The FD is inserted and ejected in/from the FDD through the FD loading slot in directions along a bidirectional arrow A–A'.

The main assembly 10 comprises a main frame 11, a motor frame 12, a carriage assembly 13, a stepping motor 14, a main circuit board 15 and a front shutter 16 which are mounted on the main frame 11.

On the motor frame 12, a sub circuit board (not shown) is mounted. On the sub circuit board, a spindle motor (not shown) with a rotating axis to which a turn table 17 is fixed and a circuit for controlling an operation of the spindle motor are mounted.

The carriage 13 has a pair of magnetic heads for writing/reading information to/from magnetic recording medium of an FD.

The stepping motor 14 has a rotating axis with an outer peripheral surface in which a thread groove is cut to move the carriage assembly 13 in an extending direction along the rotating axis.

The FD loading/ejecting mechanism portion 20 comprises a disk holder 21, an ejecting plate 22 and a sub frame 23. The FD loading/ejecting mechanism portion 20 is attached to the main assembly 10 so that the disk holder 21 and ejecting plate 22 are located at the inside of the frame 11. The sub frame 23 is fixed to an upper side of the main frame 11.

The disk holder 21 is for holding the FD loaded into the FDD.

The ejecting plate 22 has an eject button 24 and holds the disk holder 21 to move upward and downward. When the FD is inserted into the FDD through the FD loading slot, the ejecting plate 22 guides the disk holder 21 downward to place the FD held by the disk holder 21 on the turn table 17. At this time, the ejecting plate 22 moves frontward (or for an ejecting direction, i.e. the direction of the arrow A') to further project the eject button 24 from the FDD. If the eject button 24 is pushed backward (or for an inserting direction, i.e. the direction of the arrow A), the ejecting plate 22 guides the disk holder 21 upward and partially projects the FD from the FD loading slot.

The sub frame 23 is fixed to the main frame 11 to support the ejecting plate 22 movably frontward and backward and to enable the ejecting plate 22 and the disk holder 21 to move as mentioned above.

The disk holder 21, the ejecting plate 22 and the sub frame 23 are individually made by blanking, pressing, and/or bending metal plates.

The cover 30 is fixed to the main frame 11 by screws (not shown) to cover the upper surface of the FDD.

Figure 2:
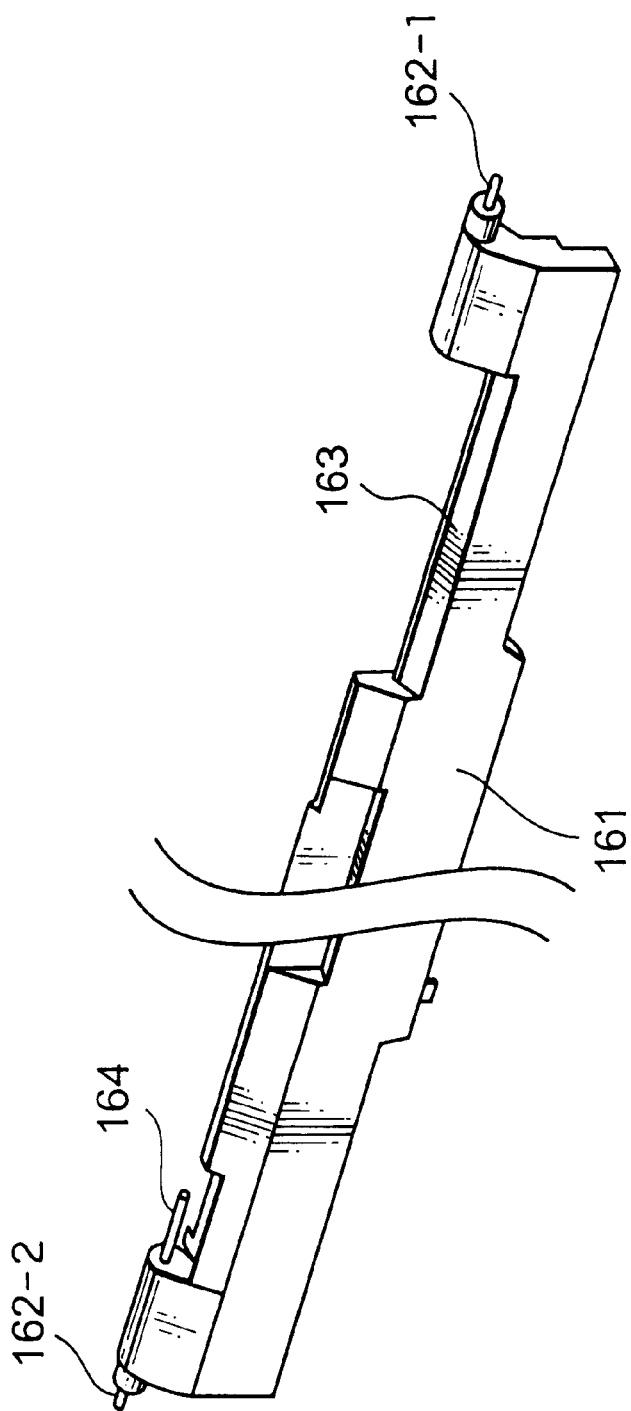
FIG. 2 is a perspective view of a front shutter used in the related front shutter attaching structure.

Next, referring to FIG. 2 together with FIG. 1, the description will be made about the front shutter 16.

The front shutter 16 is rotatably attached at a front of the main frame 11 as mentioned above. The front shutter 16 is made of, for example, synthetic resin and comprises a door member 161 and a pair of coaxial pivots 162-1 and 162-2. The door member 161 is for closing the FD loading slot of the front panel. The coaxial pivots 162-1 and 162-2 are formed at an upper part of the door member 161 to project from the both side ends of the upper part in the opposing directions. In addition, a rectangular notch 163 for the eject button 24 is formed in the door member 161 while a pin 164 for a torsion spring (not shown) is formed at the upper part of the door member 161.

The main frame 11 has side plates opposing to each other. In the side plates, holes are formed to receive the coaxial pivots 162-1 and 162-2. The tip parts of the coaxial pivots 162-1 and 162-2 are inserted in the holes of the side plates and thereby the front shutter 16 is rotatably attached to the main frame 11. Here, an interval between the side plates of the main frame 11 is smaller than a distance between the tips of the coaxial pivots 162-1 and 162-2. Thus, bending the door member 161 is necessary to attach the front shutter 16 to the main frame 11.

Figure 3:
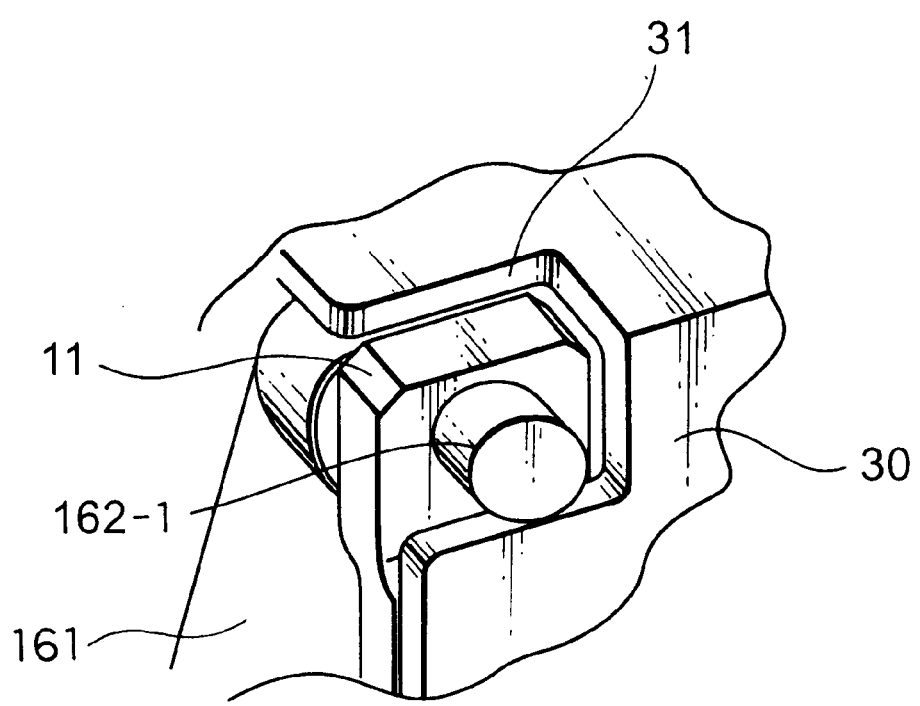
FIG. 3 is an enlarged view of a coaxial pivot of the front shutter in the FDD of FIG. 1.

FIG. 3 is an enlarged view of the coaxial pivots 162-1 and vicinity in the FDD of FIG. 1. As shown in FIG. 3, a notch 31 is formed in the cover 30 not to interfere with the rotation of the coaxial pivot 162-1. As regards the coaxial pivot 162-2, it has a symmetrical structure against that of FIG. 3.

Figure 4:
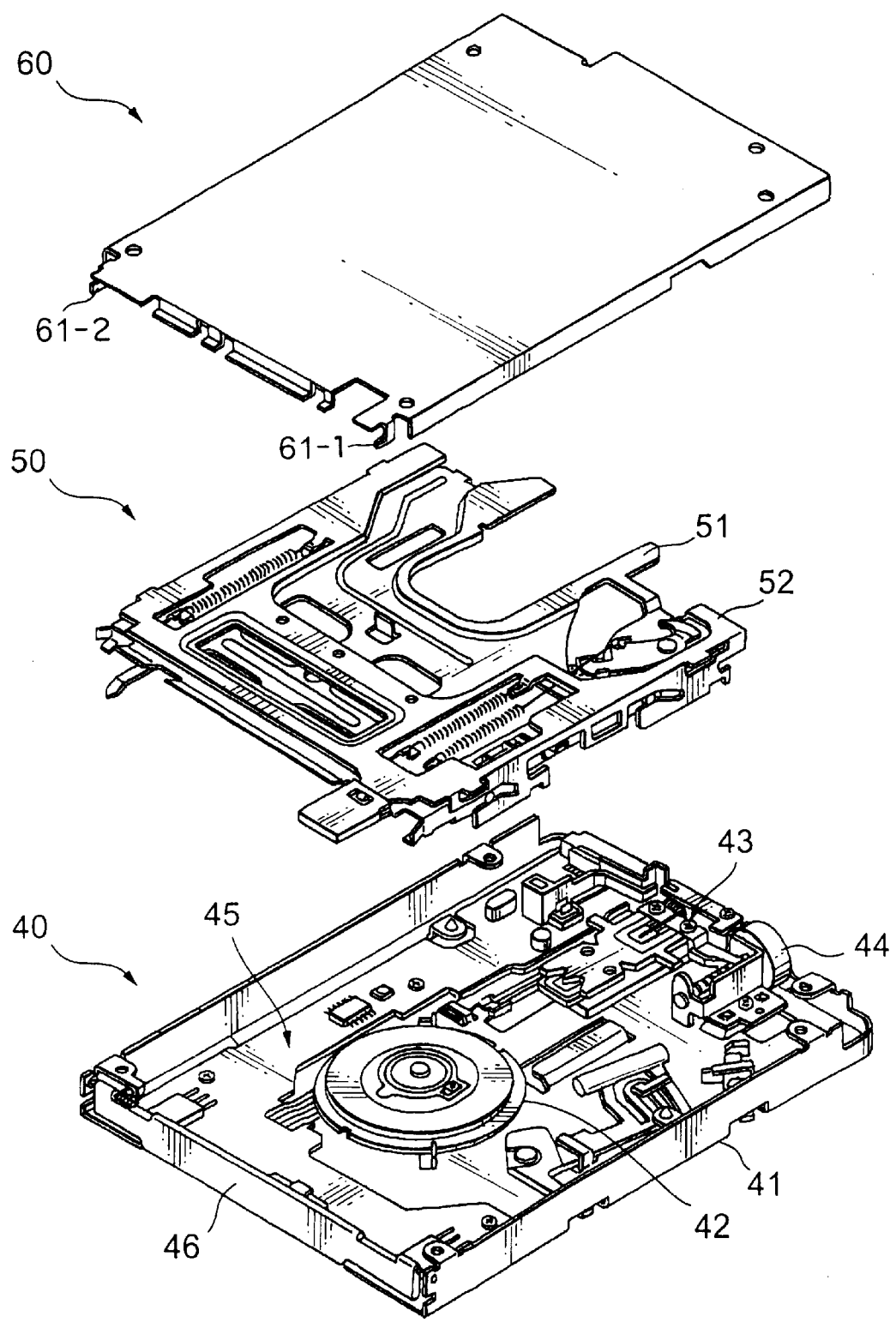
FIG. 4 is an exploded perspective view of an FDD adopting a front shutter attaching structure according to a preferred embodiment of this invention.
Figure 5:
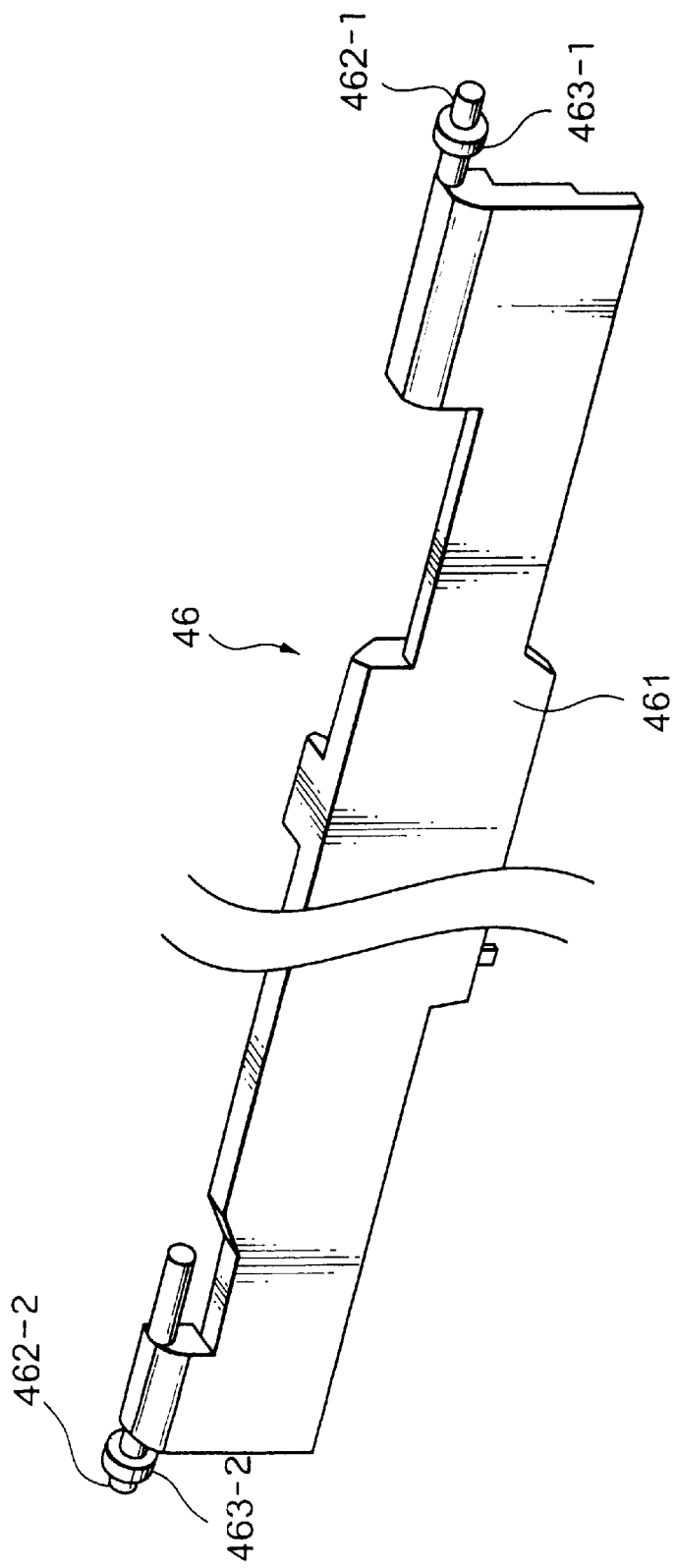
FIG. 5 is a perspective view of a front shutter used in the front shutter attaching structure adopted by the FDD of FIG. 4.
Figure 6:
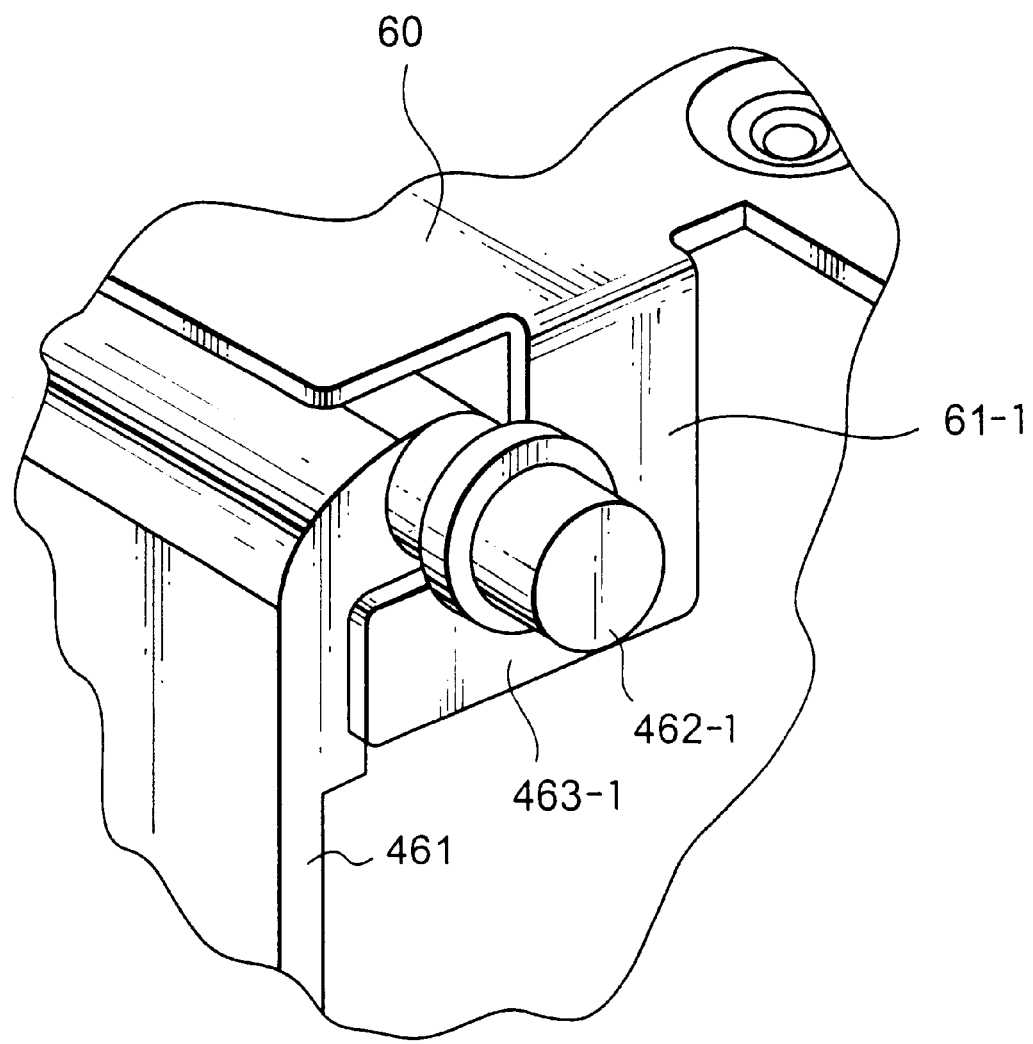
FIG. 6 is an enlarged view of a coaxial pivot of the front shutter and vicinity in the FDD of FIG. 4.

Referring to FIGS. 4 to 6, the description will proceed to a front shutter attaching structure according to a preferred embodiment of this invention.

FIG. 4 is an exploded perspective diagram of a FDD adopting the front shutter attaching structure.

The FDD of FIG. 4 comprises a main assembly 40, an FD loading/rejecting mechanism portion 50 and a cover 60 like that of FIG. 1. The structure of the FDD is essentially similar to that of the FDD shown in FIG. 1, however, there are some of improvements. For instance, the main assembly 40 has no motor frame while the FD loading/rejecting mechanism portion has no sub frame. However, because these improvements are not related to this invention directly, the description about the improvements is omitted.

The main assembly 40 comprises a main frame 41, a spindle motor (not shown) to which a turntable 42 is fixed, a carriage assembly 43, a stepping motor 44, a main circuit board 45, a front shutter 46, and so on. The spindle motor, the carriage assembly 43, the stepping motor 44, the main circuit board 45, the front shutter 46 are attached to the main frame 41.

The FD loading/rejecting mechanism portion 50 comprises a disk holder 51 and an ejecting plate 52.

Next, referring to FIG. 5 together with FIG. 4, the description will be made about the front shutter 46.

The front shutter 46 is attached to the main frame 41 as mentioned above. For example, the front shutter 46 is made by integral molding using synthetic resin. The front shutter 46 comprises a door member 461 and a pair of coaxial pivots 462-1 and 462-2.

The door member 461 is for closing an opening (or an FD loading slot) of a front panel (not shown) attached (or placed) to a front end of the main frame 41.

The coaxial pivots 462-1 and 462-2 are formed at an upper part (or at an upper edge side) of the door member 461 to project from the both side ends of the upper part of the door member 461 in the opposing directions. The coaxial pivots 462-1 and 462-2 have flanges 463-1 and 463-2 formed at little distances from the their tips. In this embodiment, each of the flanges 463-1 and 463-2 is formed at the approximately middle of each of the coaxial pivots 462-1 and 462-2.

The main frame 41 has side plates opposing to each other. In the side plates, holes are formed to receive the coaxial pivots 462-1 and 462-2. The tip parts of the coaxial pivots 462-1 and 462-2 are inserted in the holes of the side plates to attach the front shutter 46 to the main frame 41. In this event, because the flanges 463-1 and 463-2 are larger than the holes, they do not enter the holes. Accordingly, the flanges 463-1 and 463-2 restrict movement of the front shutter 46 along the extending direction (or right-hand and left-hand directions) of the coaxial pivots 462-1 and 462-2. Thus, the front shutter 46 is attached to the main frame 41 in a condition to rotate. Here, an interval between the side plates of the main frame 41 is smaller than a distance between the tips of the coaxial pivots 462-1 and 462-2. Accordingly, bending the door member 461 is necessary to attach the front shutter 46 to the main frame 41. Additionally, the distance between the flanges 463-1 and 463-2 is smaller than the interval between the side plates of the main frame 41 not to restrict the rotation of the front shutter 46.

Next, referring to FIG. 6 together with FIG. 4, the description will be made about the cover 60.

As shown in FIG. 4, the cover 60 has hooks 61-1 and 61-2 formed at both sides of a front end thereof. The hooks 61-1 and 61-2 are hooked to the coaxial pivots 462-1 and 462-2 of the front shutter 46 when the cover 60 is fixed to the main frame 41 by screws. As mentioned below, the hooks 61-1 and 61-2 serve as restrictive members to restrict movement of the flanges 463-1 and 463-2 in the direction along the coaxial pivots 462-1 and 462-2.

FIG. 6 shows the coaxial pivots 462-1 and vicinity in a state that the cover 60 is fixed to the main frame 41. However, in FIG. 6, the main frame 41, which supports the coaxial pivot 462-1, is omitted.

In FIG. 6, the hook 61-1 is between the door member 461 and the flange 463-1 as far as the direction along the coaxial pivot 462-1. That is, the hook 61-1 is close to a base of the coaxial pivot 462-1 in comparison with the flange 463-1. Because the main frame 41 is omitted in FIG. 6, it seems that the coaxial pivot 462-1 is supported by hook 61-1. However, the coaxial pivot 462-1 is actually supported by the main frame 41. The hook 61-1 is formed not to restrict the rotation of the coaxial pivot 462-1 when the cover 60 is fixed to the main frame 41. The hook 61-1 has two parts, one is located behind the pivot 462-1 regarding the FD loading direction and the other is located under the pivot 462-1.

The door member 461 is bent by a force, such as that given when the FD is inserted into the FDD, in the FD insertion direction. In this event, the coaxial pivot 462-1 receives the force to come off from the hole of the main frame 41 and the flange 463-1 strikes the hook 61-1. The hook 61-1 prevents the coaxial pivot 462-1 from moving in the direction along the coaxial pivot 462-1 and from coming off from the hole of the main frame 41.

The flange 463-2 and the hook 61-2 prevent the coaxial pivot 464-2 from coming off from the hole of the main frame 41 the same as mentioned above. Therefore, it is made to prevent the front shutter 46 from coming off from the main frame 41.

According to this embodiment, the front shutter attaching structure can prevent the front shutter from coming off from the main frame when the FD is inserted into the FDD.

The front shutter attaching structure of this embodiment is inexpensive because slight modification is made for the shape of the coaxial pivots and the cover and the number of parts is the same as that of the related front shutter attaching structure.

While this invention has thus far been described in conjunction with the preferred embodiment thereof, it will readily be possible for those skilled in the art to put this invention into practice in various other manners. For example, the restrictive member may not have a hook shape, but a rectangular shape. Furthermore, the restrictive member may be formed by parts of a peripheral member (e.g. the main frame) except for the cover. Still furthermore, the restrictive member may be located at only an inner part side of the FDD so that the coaxial pivots 462-1 and 462-2 does not come off from the holes of the main frame when the FD is inserted into the FDD. In addition, the front shutter attaching structure of this invention is applicable to the FDD of FIG. 1.

What is claimed is:

1. A front shutter attaching structure for attaching a front shutter to a main frame of a flexible disk drive, wherein said front shutter includes a door member and a pair of pivots respectively protecting from both sides of the door member, and wherein said flexible disk drive includes holes for receiving the pivots, said front shutter attaching structure comprising:

flanges formed on peripheral surfaces of the pivots; and restrictive members fixed against the main frame for restricting movement of the flanges in directions along the pivots;

wherein said restrictive members are located between said flanges.

2. A front shutter attaching structure for attaching a front shutter to a main frame of a flexible disk drive, wherein said front shutter includes a door member and a pair of pivots respectively projecting from both sides of the door member, and wherein said flexible disk drive includes holes for receiving the pivots, said front shutter attaching structure comprising:

flanges formed on peripheral surfaces of the pivots; and restrictive members fixed against the main frame for restricting movement of the flanges in directions along the pivots;

wherein said restrictive members comprise portions located at backsides of said pivots.

3. A front shutter attaching structure for attaching a front shutter to a main frame of a flexible disk drive, wherein said front shutter includes a door member and a pair of pivots respectively projecting from both sides of the door member, and wherein said flexible disk drive includes holes for receiving the pivots, said front shutter attaching structure comprising:

flanges formed on peripheral surfaces of the pivots; and restrictive members fixed against the main frame for restricting movement of the flanges in directions along the pivots;

wherein said flexible disk drive comprises a cover fixed to said main frame, and wherein said restrictive members are provided said cover.

4. A front shutter attaching structure for attaching a front shutter to a main frame of a flexible disk drive, said front shutter having a door member for closing a flexible disk loading slot of said flexible disk drive and a pair of pivots respectively projecting from both sides of an edge of said door member, and said main frame having side plates opposed to each other and having holes for receiving said pivots, said front shutter attaching structure comprising:

flanges formed on said pivots at a distance from tips of said pivots; and restrictive members at base sides of said pivots for restricting movement of said flanges in directions along said pivots when said tips of said pivots are inserted in said holes of said side plates of said main frame.

5. The front shutter attaching structure as claimed in claim 4, wherein said restrictive members are formed at a cover for covering an upper side of said main frame.

6. The front shutter attaching structure as claimed in claim 4, wherein said restrictive members respectively comprise portions located at backsides of said pivots with respect to a flexible disk loading direction.

7. A flexible disk drive having a front shutter attaching structure for attaching a front shutter to a main frame of a flexible disk drive, wherein said front shutter includes a door member and a pair of pivots respectively projecting from both sides of the door member, and wherein said flexible disk drive includes holes for receiving the pivots, said front shutter attaching structure comprising:

flanges formed on peripheral surfaces of the pivots; and restrictive members located between the flanges and fixed against the main frame for restricting movement of the flanges in directions along the pivots.

8. A flexible disk drive having a front shutter attaching structure for attaching a front shutter to a main frame of a flexible disk drive, wherein said front shutter includes a door member and a pair of pivots respectively projecting from both sides of the door member, and wherein said flexible disk drive includes holes for receiving the pivots, said front shutter attaching structure comprising:

flanges formed on peripheral surfaces of the pivots; and restrictive members comprising portions located at backsides of the pivots, and fixed against the main frame for restricting movement of the flanges in directions along the pivots.

9. A flexible disk drive having a front shutter attaching structure for attaching a front shutter to a main frame of a flexible disk drive, wherein said front shutter includes a door member and a pair of pivots respectively projecting from both sides of the door member, and wherein said flexible disk drive includes holes for receiving the pivots, said front shutter attaching structure comprising:

flanges formed on peripheral surfaces of the pivots; and restrictive members provided on the cover and fixed against the main frame for restricting movement of the flanges in directions along the pivots.

* * * * *